(12) United States Patent
Ranco et al.

(10) Patent No.: US 11,361,009 B2
(45) Date of Patent: Jun. 14, 2022

(54) GROUPING USERS OF A MOBILE NETWORK (71) Applicant: International Business Machines Corporation, Armonk, NY (US)

(72) Inventors: Gabriele Ranco, Dublin (IE); Moises Noe Sanchez Garcia, Dublin (IE); Gordon Doyle, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 16/710,513

(22) Filed: Dec. 11, 2019

(65) Prior Publication Data

US 2021/0182323 A1 Jun. 17, 2021

(51) Int. Cl.
| | |
|---|---|
| *G06F 16/332* | (2019.01) |
| *H04L 101/654* | (2022.01) |
| *G06F 16/58* | (2019.01) |
| *H04W 8/26* | (2009.01) |
| *G06F 16/33* | (2019.01) |
| *H04W 8/18* | (2009.01) |
| *G10L 15/26* | (2006.01) |
| *G06V 10/46* | (2022.01) |

(52) U.S. Cl.
CPC ...... *G06F 16/3329* (2019.01); *G06F 16/3344* (2019.01); *G06F 16/5866* (2019.01); *G06V 10/464* (2022.01); *G10L 15/26* (2013.01); *H04L 61/6054* (2013.01); *H04W 8/186* (2013.01); *H04W 8/26* (2013.01)

(58) Field of Classification Search
CPC ............. G06F 16/3329; G06F 16/5866; G06F 16/3344; G06V 10/464; G10L 15/26; H04L 61/6054; H04W 8/186; H04W 8/26
See application file for complete search history.

(56) References Cited

U.S. PATENT DOCUMENTS

| | | | |
|---|---|---|---|
| 6,081,705 A | 6/2000 | Houde | |
| 6,968,179 B1 | 11/2005 | De Vries | |
| 8,150,416 B2 | 4/2012 | Ribaudo | |
| 9,699,660 B1* | 7/2017 | Blatt | ............... H04W 12/126 |
| 2006/0092904 A1 | 5/2006 | Carson | |
| 2006/0274703 A1 | 12/2006 | Connelly | |
| 2012/0015626 A1 | 1/2012 | Corem | |
| 2016/0352778 A1* | 12/2016 | Chari | .................. G06N 20/00 |

(Continued)

FOREIGN PATENT DOCUMENTS

| | | |
|---|---|---|
| CN | 104915879 A | 9/2015 |
| CN | 105488154 A | 4/2016 |

(Continued)

OTHER PUBLICATIONS

Chen et al., "Business Intelligence and Analytics: From Big Data To Big Impact", Mis Quarterly vol. 36 No. 4/Dec. 2012, Special Issue: Business Intelligence Research, 24 pages.

(Continued)

*Primary Examiner* — Michael Colucci
(74) *Attorney, Agent, or Firm* — Stephen R. Yoder (57) ABSTRACT

Identifying groupings of individual users of a mobile network. In particular, some embodiments are configured to obtain transaction data records from one or more mobile network provider(s). Groupings of users may be identified by capturing association patterns in the data by applying word embedding.

18 Claims, 4 Drawing Sheets

(56) References Cited

U.S. PATENT DOCUMENTS

| | | | |
|---|---|---|---|
| 2017/0078415 | A1 | 3/2017 | Wang |
| 2017/0180940 | A1 | 6/2017 | Goldfarb |
| 2019/0294695 | A1 | 9/2019 | Stoyanovsky |
| 2019/0311308 | A1* | 10/2019 | Yang .................. H04L 67/20 |
| 2019/0361900 | A1 | 11/2019 | Rogynskyy |
| 2020/0057612 | A1* | 2/2020 | Doyle .................. G06F 8/35 |

FOREIGN PATENT DOCUMENTS

| | | |
|---|---|---|
| CN | 108182589 A | 6/2018 |
| CN | 109542950 A | 3/2019 |

OTHER PUBLICATIONS

Dasgupta et al., "Social Ties and their Relevance to Churn in Mobil Telecom Networks", EDBT'08, Mar. 25-30, 2008, Nantes, France, Copyright 2008 ACM 978-1-59593-926-5/08/0003, 2 pages.

Fielding et al., "A review of methods for the assessment of prediction errors in conservation presence / absence models", Environmental Conservation 24 (1): 38-49 © 1997 Foundation for Environmental Conservation, 12 pages.

Kisilevich et al., "Event-based analysis of people's activities and behavior using Flickr and Panoramio geotagged photo collections", IEEE, 2010, 8 pages.

Liu et al., "Topical Word Embeddings", Proceedings of the Twenty-Ninth AAAI Conference on Artificial Intelligence, Copyright © 2015, Association for the Advancement of Artificial Intelligence (www.aaai.org), 7 pages.

Mehran et al., "Abnormal Crowd Behavior Detection using Social Force Model", 978-1-4244-3991-1/09, © 2009 IEEE, 8 pages.

Mikolov et al., "Distributed Representations of Words and Phrases and their Compositionality", In Advances in neural information processing systems, 2013, 9 pages.

Ranco et al., "A Feasible and Accurate Buddy Model for Mobile Network Providers", Apr. 12, 2019, 5 pages.

Rong, Xin, "word2vec Parameter Learning Explained", arXiv:1411.2738v4 [cs.CL] Jun. 5, 2016, 21 pages.

Strobel, Daehyun, "IMSI Catcher", Jul. 13, 2007, Seminararbeit Ruhr-Universitat Bochum, 28 pages.

Velasco et al., "Social media and internet-based data in global systems for public health surveillance: a systematic review", Milbank Q. Mar. 2014;92(1):7-33. doi: 10.1111/1468-0009.12038, 20 pages.

Xu et al., "Semantic based representing and organizing surveillance big data using video structural description technology", Journal of Systems and Software, vol. 102, Apr. 2015, 9 pages.

Patent Cooperation Treaty PCT "Notification of Transmittal of the International Search Report and The Written Opinion of the International Searching Authority, or the Declaration", Applicant's file reference P201903179, International application No. PCT/IB2020/061449, International filing date Dec. 3, 2020, dated Mar. 15, 2021, 9 pages.

* cited by examiner

GROUPING USERS OF A MOBILE NETWORK

BACKGROUND

The present invention relates generally to the field of mobile networks, and more particularly to identifying groupings of individual users of a mobile network.

Natural language processing (NLP) is known. As of Dec. 3, 2019, the Wikipedia entry for "Natural Language Processing" states as follows: "Natural language processing (NLP) is a subfield of linguistics, computer science, information engineering, and artificial intelligence concerned with the interactions between computers and human (natural) languages, in particular how to program computers to process and analyze large amounts of natural language data. Challenges in natural language processing frequently involve speech recognition, natural language understanding, and natural language generation."

The term "International Mobile Subscriber Identity" (IMSI) is known. As of Dec. 3, 2019, the Wikipedia entry for "International Mobile Subscriber Identity" states as follows: "The international mobile subscriber identity or IMSI . . . is a number that uniquely identifies every user of a cellular network. It is stored as a 64-bit field and is sent by the mobile device to the network. It is also used for acquiring other details of the mobile in the home location register (HLR) or as locally copied in the visitor location register. To prevent eavesdroppers from identifying and tracking the subscriber on the radio interface, the IMSI is sent as rarely as possible and a randomly-generated TMSI is sent instead . . . . An IMSI is usually presented as a 15-digit number but can be shorter . . . . The length of the [Mobile Network Code] MNC depends on the value of the [Mobile Country Code] MCC, and it is recommended that the length is uniform within a MCC area. The remaining digits are the mobile subscription identification number (MSIN) within the network's customer base, usually 9 to 10 digits long, depending on the length of the MNC. The IMSI conforms to the ITU E.212 numbering standard."

The term "word2vec" is known. As of Dec. 4, 2019, the Wikipedia entry for "word2vec" states as follows: "Word2vec is a group of related models that are used to produce word embeddings. These models are shallow, two-layer neural networks that are trained to reconstruct linguistic contexts of words. Word2vec takes as its input a large corpus of text and produces a vector space, typically of several hundred dimensions, with each unique word in the corpus being assigned a corresponding vector in the space. Word vectors are positioned in the vector space such that words that share common contexts in the corpus are located close to one another in the space."

SUMMARY

Embodiments of the present invention provides a method for identifying groupings of individual users of a mobile network. Such a method may be computer-implemented. Embodiments of the present invention further provide a computer program product including computer program code for implementing the proposed method when executed on a processor. Embodiments of the present invention further provides a system adapted to execute this computer program code.

Embodiments of the present invention further provides a system for identifying groupings of individual users of a mobile network. According to an embodiment of the present invention there is provided a method for identifying groupings of individual users of a mobile network. The method includes obtaining transaction data records from one or more mobile network provider(s) of the mobile network. The method also includes identifying a plurality of user occurrences based on the obtained transaction data records, each user occurrence being representative of an occurrence of an associated user at a time and location within the mobile network. The method also includes applying word embedding to the plurality of user occurrences to generate a word embedding model mapping the plurality of user occurrences to words of a vocabulary. The method further includes processing the word embedding model with a Natural Language Processing, NLP, algorithm to identify a relationship between different users of the mobile network.

Proposed are concepts for identifying groupings of users (e.g. social groups, shared interest groups, etc.) of a mobile communications network by the use of their associated devices at several different times and locations. Some embodiments of the present invention leverage data that is conventionally collected by a mobile network provider as a source of information for identifying groupings.

By way of example, identification of user groupings may be based on data relating to usage of the mobile network. In particular, the International Mobile Subscriber Identity (IMSI), time-stamp of the interactions between the network and a mobile device, and identifier of a unit cell of the network used to connect may be employed as important sources of information for identifying relationships between different users of the mobile network. For instance, with these data variables, embodiments may be provided with enough information to associate the IMSIs to corresponding subscribers, and to specific places during specific time windows. After such association is undertaken, co-occurrences may be determined and analyzed to identify affinity between users and/or locations.

Some embodiments leverage the widespread availability and use of mobile computing devices with mobile network connectivity capabilities, (e.g. smartphones, tablets, smartwatches, laptop computers, etc.) to obtain or access a large amount of information that can be used to identify and validate relationships between users.

Embodiments address the issue that conventional approaches need to deal with very large numbers of IMSIs and cell IDs (which generate many possible concurrencies). In particular, some embodiments apply word embedding models, like the known word2vec or Glove models, to associate identified user occurrences caused by contemporaneous activation of mobiles in a particular cell in a given time. Also, some embodiments employ Natural Language Processing (NLP) models for word embedding that are designed to work with a large corpus of text and large dictionaries of words. In this way, some embodiments make use of processes that are well-suited to capturing association patterns from the big data variables generated by the mobile network providers.

Some embodiments of the present invention address the issue of the high level of noise and spurious events in high volumes of Transaction Data Records (TDR) from mobile network providers so as to identify social groups through building clusters of mobile network subscribers, and this may be done based on a spatial temporal co-occurrences criterion.

Widespread diffusion of mobile networks provides a large dataset from which information can be extracted. However, the dimensionality of the data makes it difficult to identify social ties between users. In some embodiments, employing a word embedding technique to the dataset offers an improved approach which can potentially provide valuable information about user groupings and/or relationships.

In some embodiments, identifying a plurality of user occurrences further include: identifying co-occurrence of user occurrences with respect to time or location; and based on the identified co-occurrence of user occurrences, training at least one of the word embedding and NLP algorithm. Embodiments therefore employ learning techniques to improve accuracy of determinations.

The transaction data records include data regarding: the International Mobile Subscriber Identity, IMSI, associated with transaction; the time of a transaction; and the identifier of a unit cell of the mobile network. In this way, embodiments leverage data that is readily available via mobile network providers, thus alleviating a need to generate new and/or proprietary information.

In some embodiments, applying word embedding includes employing a word-to-vector (word2vec) model to produce word embeddings. This helps to create a low dimensionality representation of IMSI that contains information about their relationship.

In some embodiments, processing the word embedding model with a NLP algorithm includes: for each of a plurality of subsets of the word embedding model, applying a negative sampling algorithm to subsets of the word embedding model so as to determine weighting values for the user occurrences. Further, processing the word embedding model with a NLP algorithm further includes: determining a vector for each user occurrence based on the determined weighting values.

Applying word embedding includes training a word embedding model with a Continuous Bag of Words comprising a plurality of IMSIs. This assists training to capture one or more relationships between the IMSIs.

According to another embodiment of the present invention, there is provided a computer program product for identifying groupings of individual users of a mobile network, the computer program product comprising a computer readable storage medium having program instructions embodied therewith, the program instructions executable by a processing unit to cause the processing unit to perform a method according to one or more embodiments when executed on at least one processor of a data processing system.

According to yet another embodiment, there is provided a processing system including at least one processor and the computer program product according to one or more embodiments, wherein the at least one processor is adapted to execute the computer program code of said computer program product.

According to another embodiment of the present invention, there is provided a system for identifying groupings of individual users of a mobile network. The system includes an interface component configured to obtain transaction data records from one or more mobile network provider(s) of the mobile network. The system also includes a data analysis component configured to identify a plurality of user occurrences based on the obtained transaction data records, each user occurrence being representative of an occurrence of an associated user at a time and location within the mobile network. The system also includes a word embedding component configured to apply word embedding to the plurality of user occurrences to generate a word embedding model mapping the plurality of user occurrences to words of a vocabulary. The system yet further includes a processing unit configured to process the word embedding model with a NLP algorithm to identify a relationship between different users of the mobile network.

Some embodiments are employed in conjunction with existing and/or conventional mobile networks. For example, there may be provided a mobile network including a system according to a proposed embodiment. Alternatively, some embodiments are implemented in a server device. Such a server device is a cloud-based server resource accessible via the Internet.

DETAILED DESCRIPTION

Some embodiments of the present invention are directed to identifying groupings of individual users of a mobile network. In particular, some embodiments of the present invention are configured to obtain transaction data records from one or more mobile network provider(s). Additionally, groupings of users may be identified by capturing association patterns in the data by applying word embedding.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present invention, a system may be a single device or a collection of distributed devices that are adapted to execute one or more embodiments of the methods of the present invention. For instance, a system can be a personal computer (PC), a server or a collection of PCs and/or servers connected via a network such as a local area network, the Internet and so on to cooperatively execute at least one embodiment of the methods of the present invention. Further, a component may be an integration flow that is executed by one or more processing units.

Some embodiments of the present invention recognize the following facts, potential problems and/or potential areas for improvement with respect to the current state of the art: (i) the identification of groupings of people is a common desire (for example, for the purposes of marketing); (ii) conventional approaches to grouping people typically require significant amounts of time and/or computational resources; (iii) the recent technological revolution with the widespread presence of mobile smart-phones and Internet of Things (IoT) systems has created an unprecedented amount of available data, introducing the possibility of analyzing more details of human social interactions; (iv) user interaction with technological systems can generate large datasets that document collective behavior of users; and/or (v) although datasets (and therefore available information) have increased in volume, the level of noise and spurious events has also increased.

In some embodiments, a mobile network includes a mobile network communication system including multiple servers and numerous client (mobile) computing devices connected to the servers via communications links provide by the mobile network. Each client (mobile) computing device may be associated with a particular user and be configured to communicate via the network with a mobile network provider which enables communication with other client (mobile) computing devices. Each client (mobile) computing device may be assigned an International Mobile Subscriber Identity that is unique to the device and/or the associated user.

Embodiments for identifying groupings of individual users of a mobile network are presented below. Such embodiments are employed to identify relationships or associations between users of the mobile network. This is of particular benefit for overcoming noise and spurious events in high volumes of Transaction Data Records (TDRs) from mobile network providers. In particular, application of word embedding to identify user occurrences are employed by some embodiments.

By way of example, some embodiments are configured to identify social groups of users by the activation of their associated devices in several locations at different times. Such embodiments leverage TDRs collected by a mobile network provider as a source of data. Identification of groupings may be based on the relevant data regarding the usage of the mobile network. In particular, embodiments use information regarding the International Mobile Subscriber Identity (IMSI), time-stamp of the interactions between the network and the mobile device, and the identifier of the unit cell of the network used to connect. Using such data, IMSIs may be associated with the user occurrences in the mobile network.

By way of example, some embodiments take advantage of the word2vec machine learning generalization capabilities to determine user relationships within a mobile communications network. This may be done using TDRs available within the network to build training datasets representative of the co-occurrences of the users.

Figure 1:
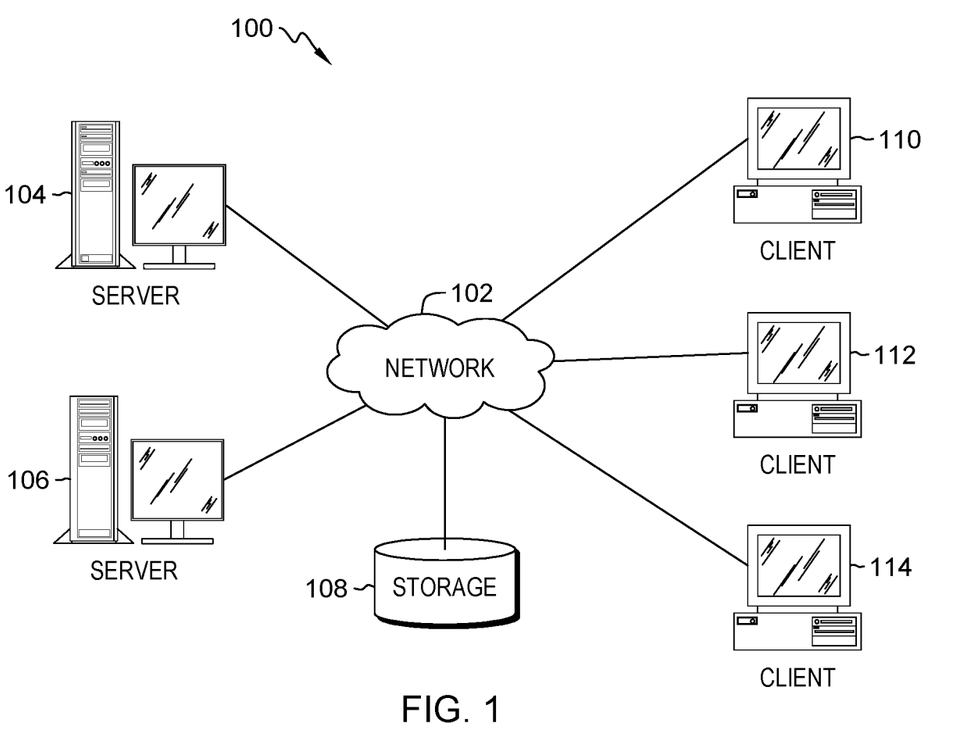
FIG. 1 is a pictorial representation of an example distributed system in which aspects of the illustrative embodiments may be implemented.

FIG. 1 is a pictorial representation of an exemplary distributed system in which aspects of the illustrative embodiments may be implemented. A distributed system 100 may include a network of computers in which aspects of the illustrative embodiments may be implemented. The distributed system 100 contains at least one mobile network 102, which is the medium used to provide communication links between various mobile devices and computers connected together within the distributed data processing system 100. The network 102 may include connections, such as wire, wireless communication links, or fiber optic cables.

In the depicted example, first 104 and second 106 servers are connected to the network 102 along with a storage unit 108. In addition, clients 110, 112, and 114 are also connected to the network 102. The clients 110, 112, and 114 may be edge devices, for example, personal computers, network computers, IoT devices, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Those of ordinary skill in the art will appreciate that the hardware in FIG. 1 may vary depending on the implementation. Also, the processes of the illustrative embodiments may be applied to a multiprocessor data processing system, other than the system mentioned previously, without departing from the scope of the present invention.

Moreover, embodiments may take the form of any of a number of different data processing systems including client computing devices, server computing devices, a tablet computer, laptop computer, telephone or other communication device, a personal digital assistant (PDA), or the like. In some illustrative examples, a system according to an embodiment may be a portable computing device that is configured with flash memory to provide non-volatile memory for storing operating system files and/or user-generated data, for example. Thus, a system according to a proposed embodiment may essentially be any known or later-developed data processing system without architectural limitation.

Figure 2:
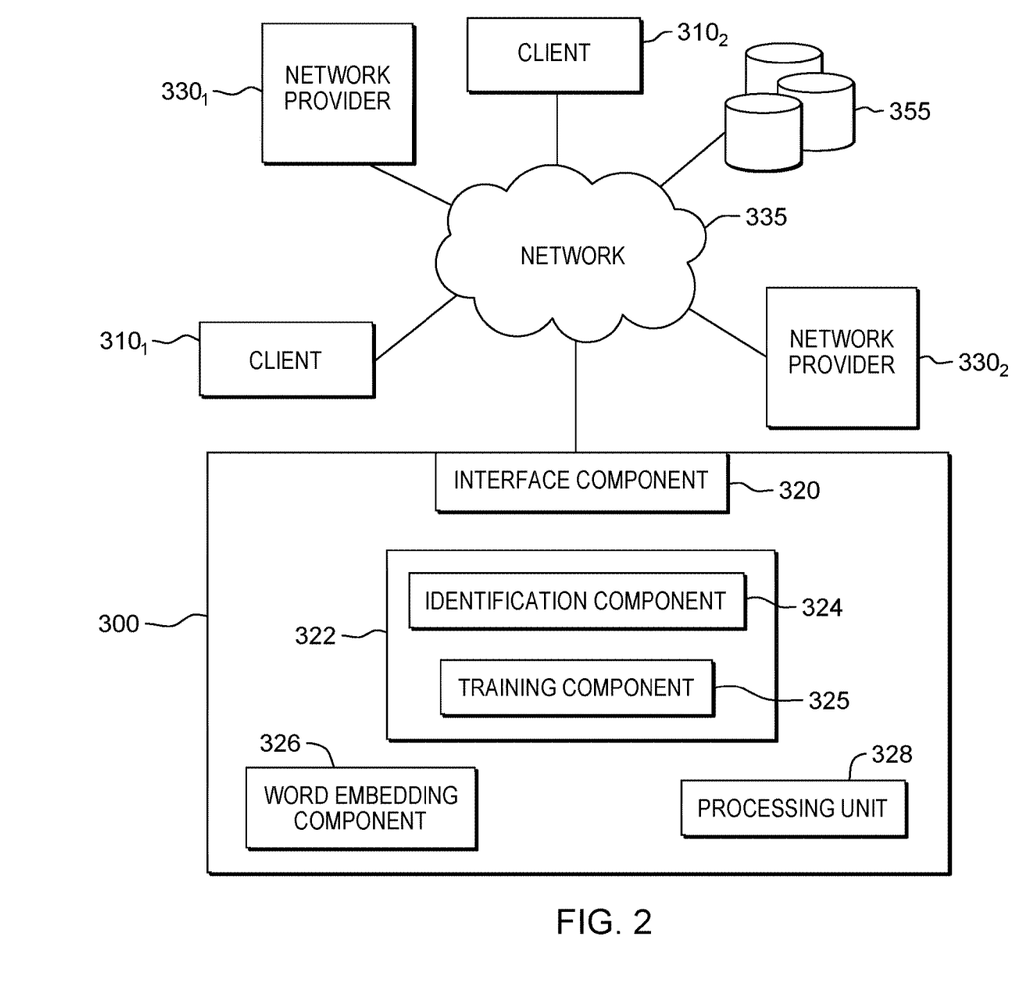
FIG. 2 is a schematic diagram of a distributed communication system according one embodiment of the present invention.

Proposed embodiments provide a method and system for identifying associations between individual users of a mobile network. By way of further explanation, a proposed embodiment of a system 300 will now be described with respect to a distributed communication system including a plurality of users 3101, 3102 and a plurality of network providers 3301, 3302.

Referring to FIG. 2, there is depicted a schematic diagram of a distributed communication system according to an embodiment. The communication system includes a system 300 for identifying associations between individual users of a mobile network according to an embodiment.

In this example, first 3101 and second 3102 clients are configured to communicate via a network 335 with first 3301 and second 3302 network providers. The first 3301 and second 3302 network providers maintain transaction data records in a database 355 that is accessible via the network 335. By way of example, each transaction data record stored in the database comprises data regarding: the IMSI associated with each transaction; the time of a transaction; and the identifier of a unit cell of the mobile network.

The system 300 includes an interface component 320 that is configured to obtain TDR from one or more of the network provider(s). In this example, obtaining TDRs from a network provider involves accessing, in the database 355, TDRs associated with that network provider.

The system 300 also comprises a data analysis component 322. The data analysis component 322 is configured to identify a plurality of user occurrences based on the obtained transaction data records. Here, each user occurrence is representative of an occurrence of an associated user at a time and location within the mobile network, i.e. an occurrence of a user in the TDR is an interaction between the device and the mobile network.

More specifically, in the exemplary embodiment of FIG. 2, the data analysis component 322 includes an identification component 324 that is configured to identify cooccurrence of user occurrences with respect to time or location. The data analysis component 322 also includes a training component 325 that is configured to train at least one of the word embedding and NLP algorithm based on the identified co-occurrence of user occurrences.

The system 300 also includes a word embedding component 326 that is configured to apply word embedding to the plurality of user occurrences to generate a word embedding model mapping the plurality of user occurrences to words of a vocabulary. By way of example, the word embedding component 326 is configured to employ a word2vec model to produce word embeddings. Also, the word embedding component 326 is configured to train a word embedding model with a Continuous Bag of Words comprising a plurality of IMSIs.

The system 300 also includes a processing unit 328. The processing unit 328 is configured to process the word embedding model with a Natural Language Processing, NLP, algorithm to identify a relationship between different users of the mobile network. Specifically, in this example, the processing unit 328 is configured to, for each of a plurality of subsets of the word embedding model, apply a negative sampling algorithm to subsets of the word embedding model so as to determine weighting values for the user occurrences. Based on the determined weighting values, the processing unit 328 then determines a vector for each user occurrence.

Figure 3:
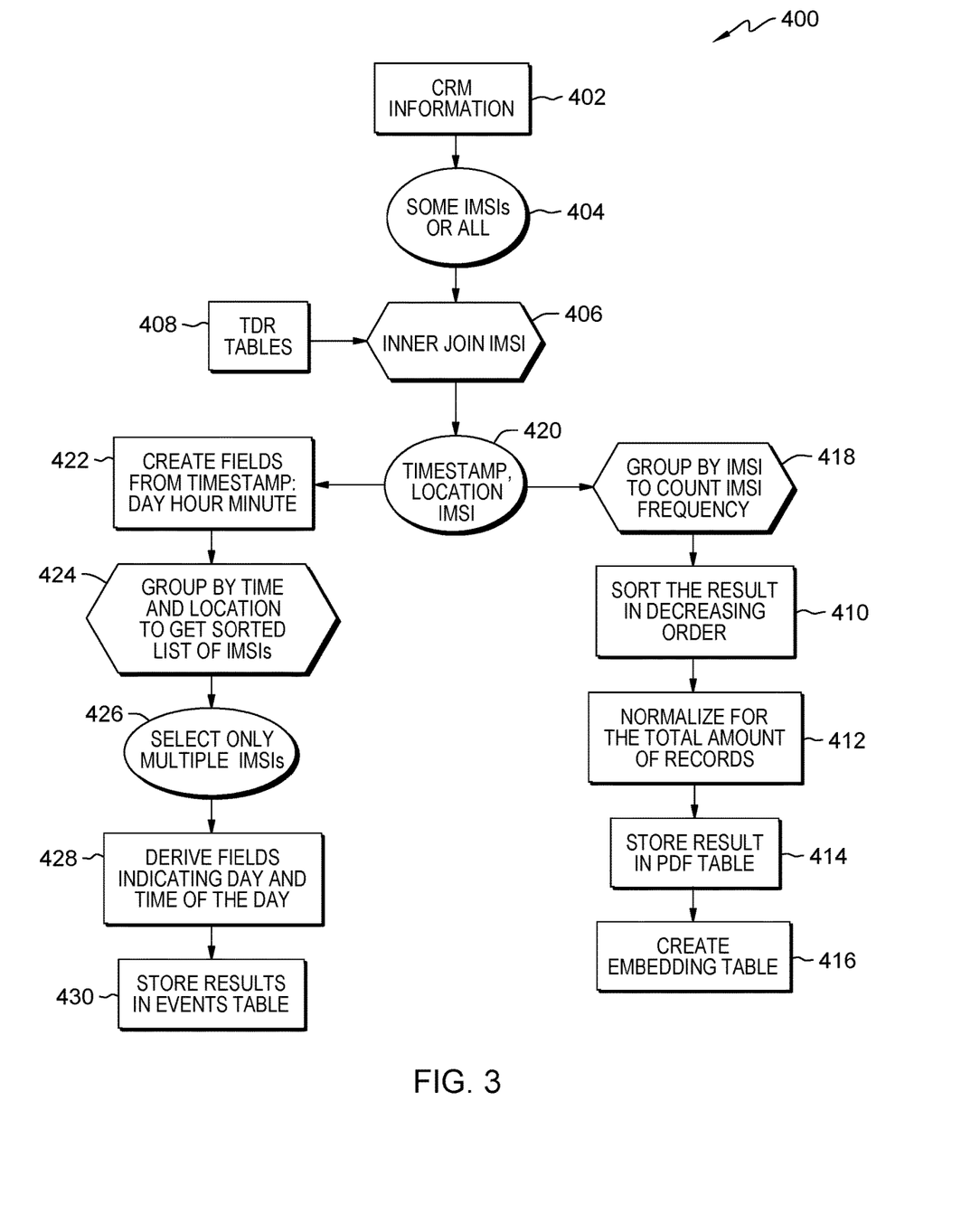
FIG. 3 is a flow diagram showing steps involved in creating an input dataset where word2vec models can be applied according to some embodiments of the present invention.

By way of further explanation and illustration of proposed concepts, an exemplary implementation of a method according to an embodiment may comprise the following three basic steps:

(i) Create two data table inputs to build a word2vec model with a series of database operations from retrieved TDRs. The first of these two tables contains the list of sequences of IMSIs, and the second of the two tables contains the distribution of record counting of each IMSI in the TDRs. The first table corresponds to the corpus of sentences in a NLP problem and the second one as the distribution of word's occurrences in the corpus. By way of example, FIG. 3 shows the steps involved in creating an input dataset where word2vec models can be applied. Here, it may be preferable to join the TDR tables with a subset of the IMSIs selected from Customer Relationship Management records that network providers typically maintain. However, there is no restriction on the data tables that can be used. It may be preferable to use CRM because, in practice, some IMSIs present in the TDRs may not be useful.

(ii) Train the word embedding model with a Continuous Bag of Words (CBOW) and negative sampling.

(iii) Provided with one IMSI, compute the list of the remaining most similar IMSIs. This is done by computing all of the cosine similarity between the given IMSI and the others.

After completing the above three steps (i)-(iii), one may identify the subscribers that spend more time in a given location, but cannot identify a relevant pattern associated to a specific location. This is done by applying a small variation to word2vec (such as "doc2vec"). The variation results are fed into a model that is configured to learn the document vector representation. Thus, if one considers the cell ID to be a paragraph indicator (from a NLP analogy), one can obtain a label/center able to adjust the similarity computation and predict the closest people-location affinity and build relevant clusters for the identification of the social groups.

These steps can therefore be summarized as follows:

(A) The process described in the above three steps (i)-(iii) is similarly carried out, with the only difference that at the end a unique identifier is created from the cell and the time label. In particular, to the Cell ID, there is added (following the usual concatenation of strings) a label for the day of the week and for the time period of the day. This new label may be the paragraph indicator of doc2vec.

(B) The word embedding model is trained adding the location ID to the CBOW described above in step (ii).

(C) Given one IMSI, compute the list of the most similar IMSIs in the network. But this time, the ID location and period of the day is added in order to obtain lists related to location and time.

From the above description, it will be appreciated that proposed embodiments may be configured to provide extended functionality in relation to a mobile network by identifying social groupings of people. In particular, embodiments may be configured to monitor the activation of (user-associated) devices in different locations and at different times, and this may be done using TDRs from mobile networks providers. Such TDR data may, for example, contain IMSI, time-stamps and unit cell identifiers. Groupings of users may be identified by capturing association patterns in the data by applying word embedding models (like word2vec for example).

Some embodiments identify relationships between users by exclusively spotting their interactions with the network by means of determine their co-occurrences (occurrence of multiple IMSIs at a specific cell ID in a given timeframe). Such co-occurrences may, for instance, be identified based on data extracted from "IMSIs", "cell ID" and "Time Stamp". This co-occurrences information may then be used to train a word2vec model which can, in turn, be used to determine relationships of similarity between a trained model and remaining users of the network.

FIG. 3 shows flow diagram 400 with the steps involved in creating an input dataset where word2vec models can be applied according to some embodiments of the present invention. More specifically, flow diagram 400 includes the following: CRM information storage module 402, selected IMSIs 404, aggregated inner join IMSI 406, TDR table storage 408, IMSI aggregation 418, selected timestamp/location/IMSI 420, timestamp storage 422, time/location/IMSI aggregation 424, selected IMSIs 426, data field storage 428, and EVENTS table storage 430.

Additionally, flow diagram 400 shows a method according to one embodiment of the present invention, with the method including the following operations (not necessarily in the following order): (i) sort results in decreasing order (operation 410); (ii) normalize the results based, at least in part, upon the total number of records (operation 412); (iii) store results of the normalization in a PDF table (operation 414); and (iv) create an embedding table (operation 416).

Figure 4:
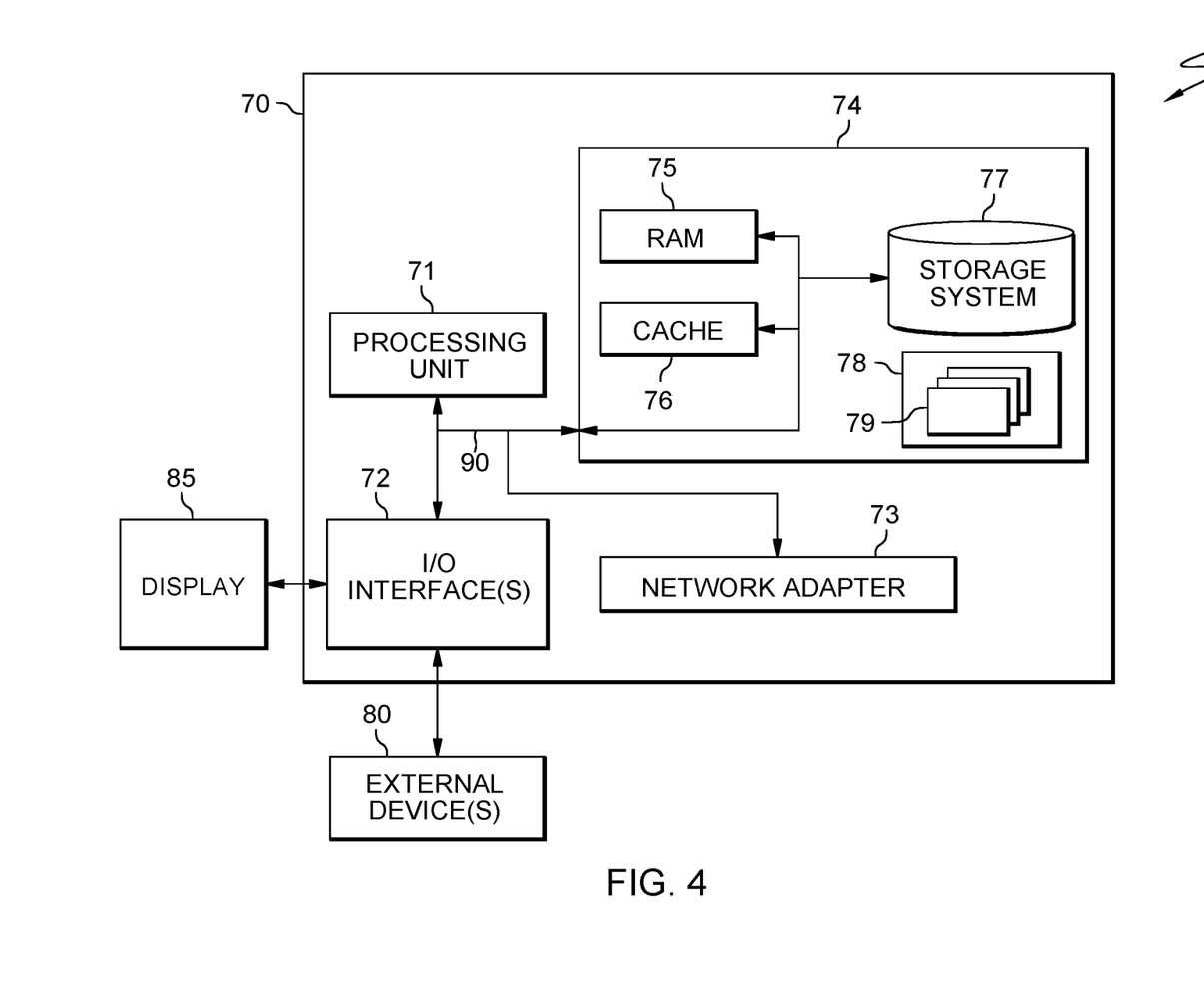
FIG. 4 is a block diagram of a system according to one embodiment of the present invention.

FIG. 4 is a block diagram of a system according to one embodiment of the present invention. FIG. 4 includes a computer system 70, which may form part of a networked system 7. For instance, a data analysis component configured to identify a plurality of user occurrences based on the obtained transaction data records according to an embodiment may be implemented in the computer system 70 (e.g. as a processing unit 71). The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. System memory 74 also includes storage system 77. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the Input/Output (I/O) interface 72 perform a method for identifying groupings of individual users of a mobile network according to a proposed embodiment.

Program/utility 78, having a set (at least one) of program modules 79, may be stored in memory 74. Program modules 79 generally carry out the functions and/or methodologies of proposed embodiments for partial write operations to memory.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate determined optimal values of DFWF to edge devices of a distributed network).

In the context of the present application, where embodiments of the present invention constitute a method, it should be understood that such a method is a process for execution by a computer, i.e. is a computer-implementable method. The steps of the method therefore reflect various parts of a computer program, e.g. parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A nonexhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, Python, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Some helpful definitions are presented below.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

What is claimed is:

1. A computer-implemented method (CIM) comprising:
obtaining transaction data records from one or more mobile network providers of a mobile network;
identifying a plurality of user occurrences based on the obtained transaction data records, wherein each user occurrence is representative of an occurrence of an associated user at a time and location within the mobile network;
applying word embedding to the plurality of user occurrences to generate a word embedding model mapping the plurality of user occurrences to words of a vocabulary, with the word embedding being trained with a Continuous Bag of Words (CBOW) model including a plurality of International Mobile Subscriber Identities (IMSIs); and
processing the word embedding model with a Natural Language Processing (NLP) algorithm to identify a relationship between different users of the mobile network.

2. The CIM of claim 1 further comprising:
identifying a co-occurrence of user occurrences with respect to time or location; and
based on the identified co-occurrence of user occurrences, training at least one of the word embedding and NLP algorithm.

3. The CIM of claim 1 wherein the transaction data records includes data, with the data including information indicative of an International Mobile Subscriber Identity (IMSI) associated with a given transaction, time data of the given transaction, and an identifier of a unit cell of the mobile network.

4. The CIM of claim 1 wherein applying word embedding includes employing a word2vec model to produce word embeddings.

5. The CIM of claim 1 wherein processing the word embedding model with the NLP algorithm includes:
for each of a plurality of subsets of the word embedding model, applying a negative sampling algorithm to subsets of the word embedding model so as to determine weighting values for the user occurrences.

6. The CIM of claim 5 wherein processing the word embedding model with the NLP algorithm further includes:
determining a vector for each user occurrence based on the determined weighting values.

7. A computer program product (CPP) comprising:
a machine readable storage device; and
computer code stored on the machine readable storage device, with the computer code including instructions and data for causing a processor(s) set to perform operations including the following:
obtaining transaction data records from one or more mobile network providers of a mobile network,
identifying a plurality of user occurrences based on the obtained transaction data records, wherein each user occurrence is representative of an occurrence of an associated user at a time and location within the mobile network,
applying word embedding to the plurality of user occurrences to generate a word embedding model mapping the plurality of user occurrences to words of a vocabulary with the word embedding being trained with a Continuous Bag of Words (CBOW) model including a plurality of International Mobile Subscriber Identities (IMSIs), and processing the word embedding model with a Natural Language Processing (NLP) algorithm to identify a relationship between different users of the mobile network.

8. The CPP of claim 7 further comprising:
identifying a co-occurrence of user occurrences with respect to time or location; and based on the identified co-occurrence of user occurrences, training at least one of the word embedding and NLP algorithm.

9. The CPP of claim 7 wherein the transaction data records includes data, with the data including information indicative of an International Mobile Subscriber Identity (IMSI) associated with a given transaction, time data of the given transaction, and an identifier of a unit cell of the mobile network.

10. The CPP of claim 7 wherein applying word embedding includes employing a word2vec model to produce word embeddings.

11. The CPP of claim 7 wherein processing the word embedding model with the NLP algorithm includes:
for each of a plurality of subsets of the word embedding model, applying a negative sampling algorithm to subsets of the word embedding model so as to determine weighting values for the user occurrences.

12. The CPP of claim 11 wherein processing the word embedding model with the NLP algorithm further includes:
determining a vector for each user occurrence based on the determined weighting values.

13. A computer system comprising:
a processor(s) set;
a machine readable storage device; and
computer code stored on the machine readable storage device, with the computer code including instructions and data for causing the processor(s) set to perform operations including the following:
obtaining transaction data records from one or more mobile network provider(s) of the mobile network, identifying a plurality of user occurrences based on the obtained transaction data records, wherein each user occurrence is representative of an occurrence of an associated user at a time and location within the mobile network, applying word embedding to the plurality of user occurrences to generate a word embedding model mapping the plurality of user occurrences to words of a vocabulary, with the word embedding using a Continuous Bag of Words (CBOW) model including a plurality of International Mobile Subscriber Identities (IMSIs), and processing the word embedding model with a Natural Language Processing, NLP, algorithm to identify a relationship between different users of the mobile network.

14. The computer system of claim 13 wherein the data analysis component includes:
identifying a co-occurrence of user occurrences with respect to time or location; and
training at least one of the word embedding and NLP algorithm based on the identified co-occurrence of user occurrences.

15. The computer system of claim 13 wherein the transaction data records include information indicative of the International Mobile Subscriber Identity (IMSI) associated with a given transaction, time data of the given transaction, and an identifier of a unit cell of the mobile network.

16. The computer system of claim 13 wherein the word embedding component is configured to employ a word2vec model to produce word embeddings.

17. The computer system of claim 13 wherein the processing unit is configured to, for each of a plurality of subsets of the word embedding model, apply a negative sampling algorithm to subsets of the word embedding model so as to determine weighting values for the user occurrences.

18. The computer system of claim 17 wherein the processing unit is configured to determine a vector for each user occurrence based on the determined weighting values.

* * * * *